United States Patent [19]

Eiche

[11] 4,344,304
[45] Aug. 17, 1982

[54] COUPLING FOR MANDRELS OR THE LIKE

[75] Inventor: Hans Eiche, Lörrach, Fed. Rep. of Germany

[73] Assignee: Kunz Maschinen- u. Apparatebau GmbH, Lorrach-Hauingen, Fed. Rep. of Germany

[21] Appl. No.: 97,963

[22] Filed: Nov. 28, 1979

[30] Foreign Application Priority Data

Dec. 5, 1978 [DE] Fed. Rep. of Germany ....... 2852510

[51] Int. Cl.³ ............................................... F16D 3/58
[52] U.S. Cl. .................................................... 464/85
[58] Field of Search ..................... 64/1 V, 7, 11 R, 14, 64/23, 30 E

[56] References Cited

U.S. PATENT DOCUMENTS

| | | | |
|---|---|---|---|
| 2,916,226 | 12/1959 | McGraw | 64/23 |
| 3,066,503 | 12/1962 | Fleming et al. | 64/23 |
| 3,147,985 | 9/1964 | Hornberger | 279/106 |
| 3,434,369 | 3/1969 | Runkle | 64/23 |
| 3,466,896 | 9/1969 | Pfarrwaller | 64/27 |
| 3,473,406 | 10/1969 | Runkle | 64/23 |
| 3,663,046 | 5/1972 | Reiner et al. | 64/23 |
| 3,827,259 | 8/1974 | Brucker | 64/30 E |
| 4,023,438 | 5/1977 | Birkle et al. | 64/1 V |
| 4,045,980 | 9/1977 | Woodward et al. | 64/23 |
| 4,269,043 | 5/1981 | Kize et al. | 64/23 |

FOREIGN PATENT DOCUMENTS

| | | |
|---|---|---|
| 755625 | 6/1953 | Fed. Rep. of Germany . |
| 917592 | 9/1954 | Fed. Rep. of Germany . |
| 2294360 | 12/1974 | France ................................ 64/1 V |

OTHER PUBLICATIONS

"Abrollungen und Abrolleinrichtugen (II)", Popier & Kunststoff-Verarbeiter, pp. 5-18, Sep. 1972.

Primary Examiner—Ira S. Lazarus
Attorney, Agent, or Firm—Kontler & Grimes

[57] ABSTRACT

A coupling for mandrels in winding machines wherein the mandrel has a square end portion receivable in a complementary cavity which is machined into a socket rotating with a shaft which drives the mandrel in a direction to collect or to pay out a web of flexible material. The socket has a hand wheel which is movable between operative and inoperative positions and the remaining part of the socket carries one or more cushions in the form of pads and/or pins which are urged against the end portion of the mandrel when the hand wheel is moved to the operative position. Additional cushions can be provided on the hand wheel. The mandrel and the socket are further provided with cooperating centering elements for the mandrel. The cushion or cushions prevent wobbling of the mandrel and reduce noise when the mandrel is driven by the shaft.

48 Claims, 5 Drawing Figures

Fig. 1

COUPLING FOR MANDRELS OR THE LIKE

BACKGROUND OF THE INVENTION

The present invention relates to a device for connecting two rotary parts so that one of such parts can transmit torque to the other part. More particularly, the invention relates to improvements in connections between drive shafts and mandrels or like rotary components which can be used as a means for collecting or paying out flexible webs consisting of paper, textile, material metallic or plastic foil or the like. Still more particularly, the invention relates to improvements in connections or coupling of the type wherein at least one end portion of the driven component has a polygonal outline and fits into the complementary cavity of a socket which forms part of or rotates with the driving component.

Couplings of the above-outlined character are used in many industries, e.g., in the paper processing industry, to enable a mandrel, core, spindle or an analogous rotary part (hereinafter called mandrel) to gather or dispense a flexible web. The same holds true for the manipulation of convoluted webs of textile material. A connection of conventional design is described, for example, in German Pat. No. 917,592. This publication discloses a so-called foldable bearing which includes a socket serving to receive, with substantial tolerance, the polygonal end portion of a mandrel. Pronounced tolerance is desirable and necessary because one and the same bearing is used to accept and to transmit torque to a substantial number of different mandrels. Thus, were the tolerances negligible or non-existent, it would be highly unlikely that one and the same socket could receive the polygonal end portions of two, three or a much larger number of different mandrels. On the other hand, pronounced tolerances exhibit a number of serious drawbacks. Thus, the mandrels are likely to wobble or perform other undesirable stray movements which promote wear and cause readily detectable noise. The mandrels run out of true (i.e., their axes do not coincide with the axes of the driving shafts), and this can affect the quality of the winding or unwinding operation. The noise which develops as a result of wobbling of a mandrel with respect to the socket or sockets for its polygonal end portion or portions is especially undesirable and highly pronounced when the mandrel is long and bulky, i.e., when the weight of the mandrel is substantial and such mandrel must be driven at a high speed. Additional causes of noise are the tension to which a web of convoluted material must be subjected, either during winding onto the mandrel or while the mandrel is rotated in a direction to pay out the convoluted material.

OBJECTS AND SUMMARY OF THE INVENTION

An object of the invention is to provide a novel and improved connection or coupling which does not generate any noise or generates only a small fraction of the noise which is expected to develop when the mandrel for gathering or paying out a web of flexible material is rotated in a conventional winding or unwinding machine.

Another object of the invention is to provide a connection or coupling which is capable of automatically terminating all or the major percentage of stray movements between the mandrel and the torque-transmitting means therefor.

A further object of the invention is to provide the coupling with novel and improved centering means for the mandrel.

An additional object of the invention is to provide a connection or coupling which permits rapid attachment of a mandrel to or rapid detachment of a mandrel from the torque-transmitting means therefor.

Another object of the invention is to provide the above-outlined connection or coupling with novel and improved means for insuring that the mandrel is invariably coaxial with the driving element and that such coaxiality is maintained even if the mandrel remains coupled to the driving element for extensive periods of time.

Still another object of the invention is to provide a connection which exhibits the above-outlined advantages even if the mandrel and/or other parts of the connection are not machined with a high degree of precision.

A further object of the invention is to provide a connection or coupling which can be used in existing winding or unwinding machines as a superior substitute for heretofore known couplings for mandrels, cores of reels, spindles or the like.

An additional object of the invention is to provide a coupling which can accept any one of a large number of mandrels and can properly drive an attached mandrel even if the dimensions of those portions of the mandrels which are to be coupled to a driving element deviate from each other within a rather wide range.

An ancillary object of the invention is to provide the coupling with a novel and improved socket for the polygonal end portions of mandrels or like driven components.

The invention is embodied in a coupling or connection which serves to separably connect a mandrel having a multi-facetted end portion of polygonal (for example, square) cross-sectional outline with a rotary torque-transmitting component, e.g., with a driving shaft which can rotate the mandrel while the latter collects or pays out a web of paper, textile material or the like. The coupling comprises a socket which is rotatable with the torque-transmitting component, which has a cavity for the end portion of the mandrel, and which is formed with internal surfaces bounding the cavity and being complementary to the facets on the end portion of the mandrel. The end portion of the mandrel is receivable in the cavity of the socket with at least some clearance, and the coupling further comprises means for compensating for the just-mentioned clearance. Such compensating means comprises at least one cushioning or damping element which is disposed between one of the internal surfaces and the adjacent (corresponding) facet on the end portion of the mandrel when the end portion is received in the cavity.

The cushioning element or elements are preferably mounted on or in the socket, and the latter may be provided with a recess (e.g., a chamber which is open toward the corresponding facet or a hole or bore, depending on the nature and configuration of the cushioning element) for a portion of the cushioning element.

The compensating means may comprise two or more pad-like, pin-shaped or otherwise configurated cushioning elements. For example, the compensating means may comprise two cushioning elements which are recessed into two parallel internal surfaces of the socket, and such internal surfaces are or may be located opposite each other.

The socket may comprise a first portion which is rigid with the torque-transmitting component and a second portion (e.g., a hand wheel) which is movable between operative and inoperative positions in which the end portion of the mandrel is confined in and can be removed from, or is outside of and can be inserted into the cavity of the socket. At least one of the aforementioned internal surfaces can be provided on the hand wheel. If the socket is constructed in the just-described manner, the coupling preferably further comprises means for urging the cushioning element or elements against the inserted end portion of the mandrel in the operative position of the hand wheel and for permitting the cushion or cushions to move away from the respective facet or facets on the end portion in response to movement of the hand wheel to the inoperative position.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
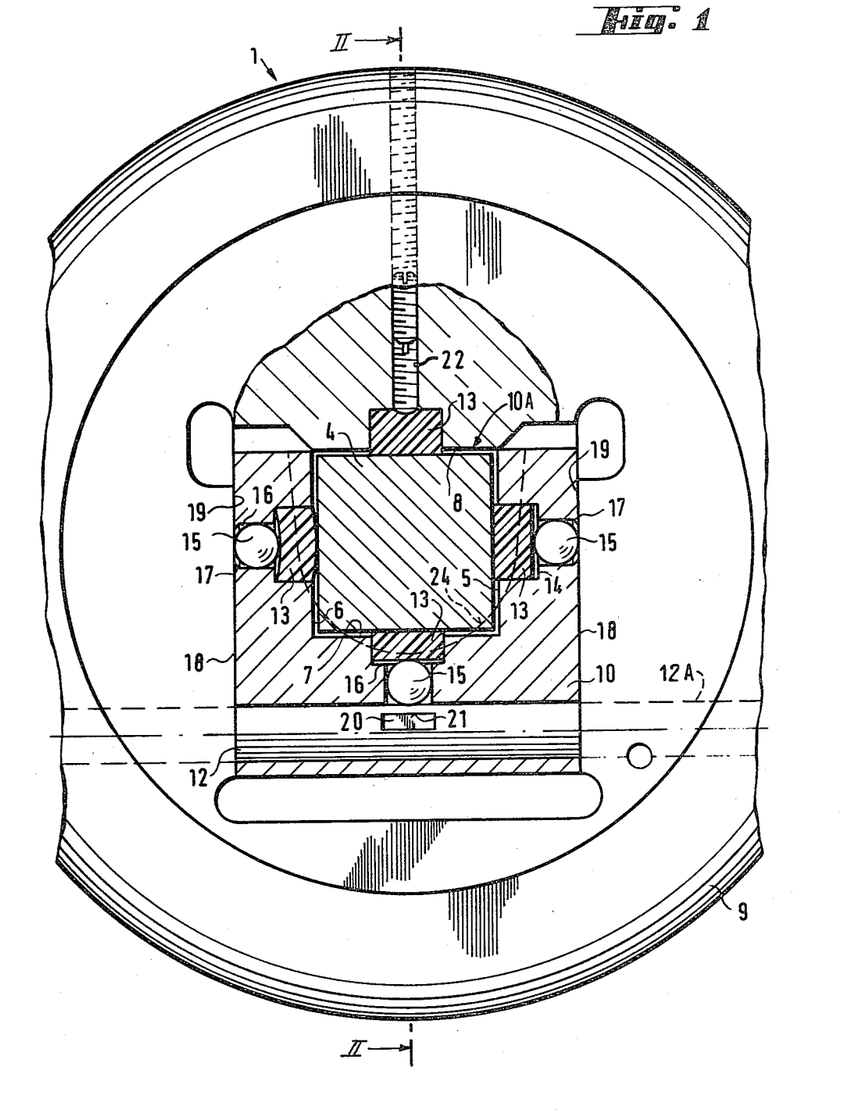
FIG. 1 is a transverse sectional view of a connection or coupling which embodies one form of the invention, as seen in the direction of the arrows I—I of FIG. 2.
Figure 2:
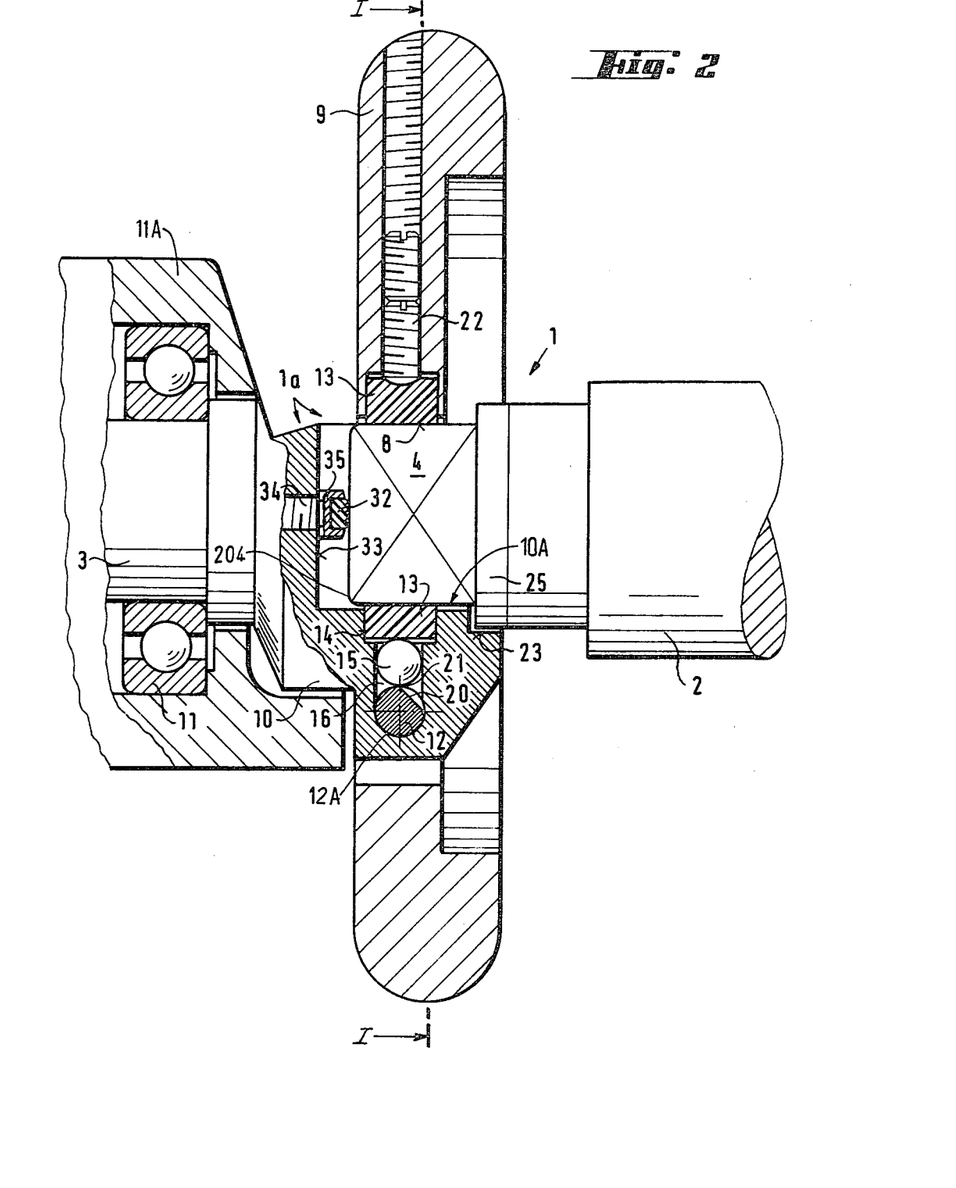
FIG. 2 is a sectional view as seen in the direction of the arrows II—II of FIG. 1.

Referring first to FIGS. 1 and 2, there is shown a connection or coupling 1 between a torque-transmitting component 3 in the form of a driving shaft and a mandrel 2 which is coaxial with the shaft 3. The mandrel 2 can be used as the core of a reel for a convoluted web consisting of paper, textile material or the like. The shaft 3 can drive the mandrel 2 in a direction to collect a web or pay out a convoluted web.

The multi-facetted end portion 4 of the mandrel 2 has a polygonal cross-sectional outline. In the illustrated embodiment, the cross-sectional outline is a square, and the end portion 4 is received, with a certain amount of clearance, in the cavity 10A of a socket 10 which rotates with and may constitute an integral part of the driving shaft 3. When properly inserted into and confined in the socket 10, the end portion 4 is bounded by five internal surfaces 5, 6, 7, 8 and 33. The surfaces 5, 6, 7 and 33 are the internal surfaces of the socket 10, and the surface 8 is the internal surface of a movable portion here shown as a hand wheel 9 which is pivotable between the operative position of FIG. 1 or 2 and the inoperative position of FIG. 3. When properly inserted into the cavity 10A of the socket 10, the multi-facetted end portion 4 of the mandrel 2 is held against any axial and/or other movement with reference to the parts 3, 9 and 10 (however, axial movement of the mandrel 2 in a direction away from the shaft 3 need not be excluded). When the coupling 1 is disengaged, (see FIG. 3), the internal surface 8 of the hand wheel 9 is moved away from the end portion 4 so that the latter can be readily removed from the cavity 10A of the socket 10 by moving it upwardly and thereupon in a direction to the right, as viewed in FIG. 3.

The shaft 3 is rotatable in an antifriction bearing 11 which is installed in a stationary or reciprocable support 11A.

Figure 3:
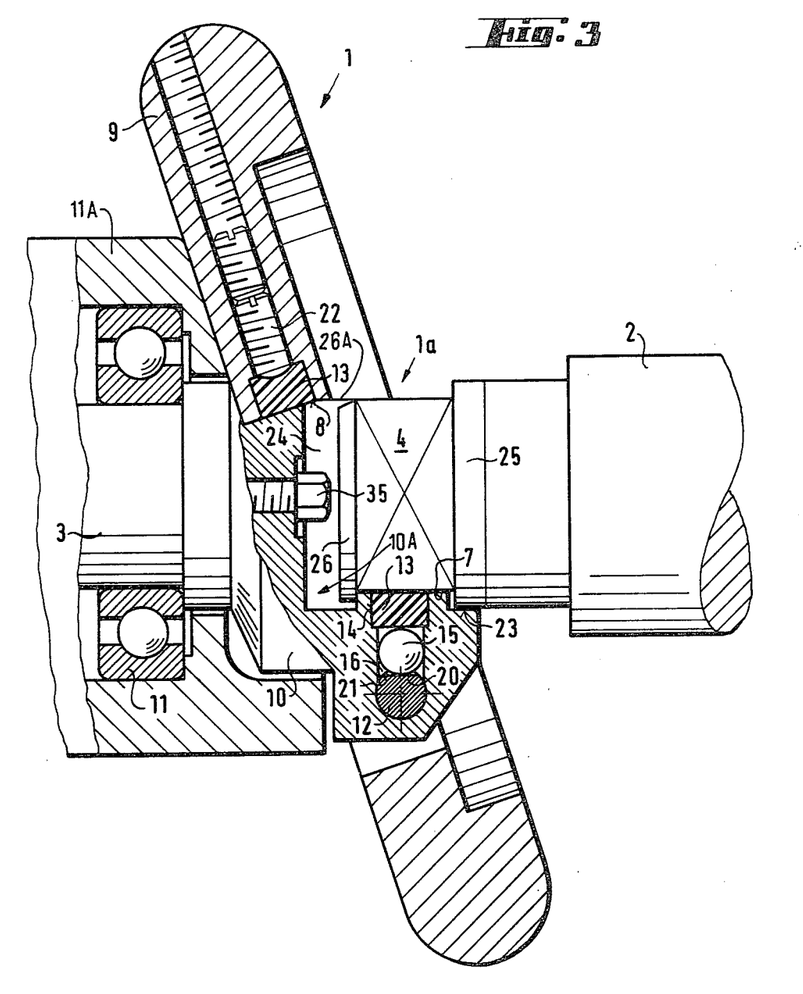
FIG. 3 illustrates the structure of FIG. 2 but with the multi-facetted end portion of the mandrel exposed so that the latter can be withdrawn from the socket.

The hand wheel 9 is pivotable between the positions of FIGS. 2 and 3 about the axis of a pintle 12 which is mounted in the front part of the socket 10. The pintle 12 is connected so that it turns with the hand wheel 9, and is rotatable in a complementary bore 12A of the socket 10. The means for non-rotatably securing the pintle 12 to the hand wheel 9 may comprise one or more screws (not shown) or the like.

The clearances between the surfaces 5–8 and 33 of the parts 10, 9, on the one hand, and the corresponding facets on the end portion 4, on the other hand, are greatly exaggerated for the sake of clarity. Such clearances are minimal and amount to minute fractions of one millimeter. The same holds true for certain other complementary surfaces of the coupling 1.

In accordance with a feature of the invention, the end portion 4 of the mandrel 2 is held against wobbling in the cavity 10A which is bounded by the surfaces 5–8 and 33 (while the hand wheel 9 is held in the operative position of FIG. 2) by a compensating unit including one or more cushioning elements 13 and 32 which bear against the corresponding (neighboring) facets of the properly inserted end portion 4 so as to eliminate play and thus insure that the shaft 3 can drive the mandrel 2 without the generation of any noise and that the mandrel shares each and every angular movement of the shaft. In the embodiment of FIGS. 1 to 3, the elements of the compensating unit are installed in the socket 10 and hand wheel 9 and comprise five discrete cushions or pads including four preferably identical cushions 13, each of which extends beyond the respective surface 5, 6, 7 and 8, at least in the operative position of the hand wheel 9. The mounting of the cushions 13 is such that, when the end portion 4 of the mandrel 2 is removed from the cavity 10A of the socket 10 and the hand wheel 9 is moved to the operative position shown in FIG. 2, each cushion 13 extends beyond the respective surface 5, 6, 7 and 8 so as to reduce the corresponding dimension of the cavity 10A and thus prevent wobbling of the end portion 4 when the mandrel 2 is coupled to the shaft 3. In the embodiment of FIGS. 1 to 3, the cushions 13 are mounted substantially centrally of the respective internal surfaces 5, 6, 7 and 8, and each of these cushions consists or may consist, at least in part, of deformable but relatively rigid material. The just-mentioned distribution of the cushions 13 is desirable because it insures that the cushions bear against the central portions of the adjacent facets on the end portion 4. This contributes to more satisfactory centering of the end portion 4 in the cavity 10A of the socket 10. Also, symmetrical distribution of the centering forces upon the end portion 4 when the hand wheel 9 is held in the operative position reduces the likelihood that the mandrel 2 will run out of true when the shaft 3 is driven by a motor or another suitable prime mover. As mentioned above, the extent to which the cushions 13 project inwardly beyond the respective surfaces 5-8 is ample to eliminate the play between the mandrel 2 and the shaft 3 when the latter transmits torque via the socket 10.

In accordance with another feature of the invention, one or more cushions 13 are automatically retracted into the respective part 9 or 10 when the hand wheel 9 is moved from the operative position of FIG. 1 or 2 to the inoperative position of FIG. 3. This facilitates the insertion of the end portion 4 into or withdrawal of such end portion from the cavity 10A of the socket 10. The parts 9 and 10 together constitute an open-and-shut composite socket or bearing 1a for the end portion 4 of the mandrel 2 and, once the composite socket 1a is opened by pivoting the hand wheel 9 in a counterclockwise direction, as viewed in FIG. 2 (the pintle 12 shares such angular movement of the hand wheel), the end portion 4 is free to enter into or be withdrawn from the cavity 10A which is in the socket 10. The cushions 13 automatically emerge from the recesses in their surfaces 5, 6 7 and 8 when the composite socket 1a is closed again, i.e., when the hand wheel 9 is pivoted back to the operative position which is shown in FIG. 2. The extent of movement of the cushions 13 to and from their retracted or extended positions is very small. Therefore, the difference between the extended and retracted positions of the cushions 13 is greatly exaggerated in the drawing for the sake of clarity. Reference may be had to FIG. 2 which shows the cushion 13 in the internal surface 7 in extended position and to FIG. 3 which shows the same cushion in the retracted position.

The cushions 13 can be moved between the extended and retracted positions in a number of different ways. For example, and as shown in FIG. 1 for the cushion 13 which can extend beyond the internal surface 5 of the socket 10, the recess 14 for such cushion can be sufficiently deep so that the entire cushion can move bodily between the extended and retracted positions. Alternatively, the marginal portions of the cushion can be clamped in or bonded to the surrounding part and the coupling 1 then further comprises a device which can deform a portion of the fixedly inserted cushion so that the latter extends, in part, beyond the respective internal surface of the socket 10 or hand wheel 9. This is shown in FIG. 1 in connection with the cushion 13 which is recessed into the socket 10 and can move its median portion beyond the internal surface 6. The means for deforming or moving the cushion 13 in the recess 14 of the surface 6 includes a spherical deforming or displacing member 15. The deformability of the material of the cushions 13 need not be very pronounced, even if the cushions are mounted in such a way that they must undergo deformation in response to movement of the hand wheel 9 to operative position. A suitable material is a relatively hard and wear-resistant synthetic plastic substance, such as polyurethane. Certain polyurethane elastomers exhibit a highly pronounced resistance to permanent deformation and are extremely hard. In spite of their hardness, such elastomers exhibit very satisfactory noise-reducing and impact-absorbing properties which are desirable in the coupling 1. Thus, the material of the cushions 13 need not yield when the end portion 4 of the mandrel 2 is inserted into and confined in the cavity 10A. Nevertheless, such cushions will greatly reduce noise and will insure that the mandrel 2 shares all or practically all angular movements of the shaft 3 and socket 10. The latter can be said to constitute a first portion of the aforementioned composite socket 1a, and the hand wheel 9 constitute a second portion of such composite socket. The first portion 10 of the composite socket 1a shares all movements of the shaft 3. The second portion or hand wheel 9 of the composite socket 1a also shares each and every movement of the shaft 2; in addition, the hand wheel 9 is pivotable with reference to the first portion or socket 10.

It has been found that cushions 13 which consist of a polyurethane elastomer are especially effective if they are mounted substantially centrally of the respective internal surfaces of the composite socket 1a and if they are biased toward the corresponding facets of the end portion 4 by spherical or analogous displacing or deforming members (such as the spheres 15). This guarantees that the loci of the maximal centering forces are disposed at the centers of the respective facets of the end portion 4 and at the centers of the cushions 13.

The manner in which the movements of the hand wheel 9 are transmitted to the means for moving the cushions 13 between the extended and retracted positions need not be the same for each and every cushion 13. For example, and as shown in FIG. 1 for the cushions 13 which are surrounded by the internal surfaces 5 and 6 (i.e., by two internal surfaces which are parallel to and are located opposite each other), the corresponding spherical deforming or shifting members 15 can be urged outwardly by the natural tendency of the associated cushions 13 to assume their underformed or unstressed condition. When the hand wheel 9 is moved toward the operative position of FIGS. 1 and 2, its internal surfaces 19 move adjacent to the external surfaces 18 (on the socket 10) from which portions of the spherical elements 15 extend into the path of the hand wheel and cause such spherical members to move inwardly toward the end portion 4 whereby the cushions 13 are deformed or shifted into engagement with the corresponding facets of the end portion 4. The spherical members 15 are turnable and movable radially of the end portion 4 in suitable passages or bores 16 of the socket 10, and the outer end portions 17 of the passages 16 have reduced diameters (cross-sectional areas) so that they prevent the escape of the spherical members 15 in the inoperative position of the hand wheel 9. For example, the material of the socket 10 can be slightly upset at the outer ends of the passages 16 so as to limit the reciprocatory movements of the spherical members 15 and prevent uncontrolled escape of such members from the respective passages 16. The members 15 need not be spheres, i.e., they may also be cylindrical or otherwise configurated plugs or posts, rollers, rings or any other members which are capable of shifting and/or deforming the associated cushions 13 in response to movement of the hand wheel 9 to its operative position. The elasticity of the material of the cushions 13 is preferably sufficient to insure that portions of the members 15 project beyond the corresponding external surfaces 18 of the socket 10 and into the path of movement of the hand wheel 9 when the hand wheel is moved toward the operative position of FIG. 3 so that the internal surfaces 19 of the hand wheel 9 can move the members 15 inwardly toward the end portion 4 of the mandrel 2 (with attendant deformation or shifting of the corresponding cushions 13 into requisite engagement with the corresponding facets of the end portion 4) when the hand wheel 9 is moved back to the operative position shown in FIGS. 1 and 2. The members 15 (or analogous deforming and/or shifting members for the cushions 13) contribute significantly to clearance-free retention of the end portion 4 in the cavity 10A of the socket 10 as soon as the composite socket 1a is closed, i.e., as soon as the hand wheel 9 is returned to its operative position.

The movability of the spherical members 15 into the path of movement of the hand wheel 9 from inoperative to operative position constitutes a highly desirable and advantageous feature of the improved coupling. Thus, the end portion 4 can be readily inserted into or withdrawn from the socket 10A as soon as the hand wheel 9 is moved to the inoperative position of FIG. 3 because the cushions 13 in the internal surfaces 5 and 6 are then retracted into the respective recesses 14 and do not interfere with movements of the end portion 4 into or from the socket 10. On the other hand, the members 15 invariably urge the corresponding cushions 13 into requisite engagement with the end portion 4 when the latter is confined in the cavity 10A and the hand wheel 9 is returned to its operative position so that the play (if any) between the end portion 4 and the composite socket 1a is zero or practically zero. As a matter of fact, the cushions 13 preferably bear against the respective facets of the end portion 4 with a rather pronounced force to further reduce the likelihood of clearance between the mandrel 2 and shaft 3.

Another important advantage of the feature that the hand wheel 9 can move the spherical members 15 inwardly toward the axis of the end portion 4 when the hand wheel is returned to the operative position of FIGS. 1 and 2 is that there is no need for additional components (such as linkages or the like) for shifting the members 15 relative to the socket 10. This contributes to simplicity, compactness and lower cost of the improved coupling.

The end portion 4 of the mandrel 2 normally consists of a metallic material. As a rule, the tolerances are negligible so that the extent to which the cushions 13 must project beyond the respective internal surfaces of the composite socket 1a is extremely small. In most instances, the transmission of torque from the shaft 2 to the mandrel 3 takes place in the regions along the edges of the facets on the end portion 4 and at the corners of such facets where the metallic material of the end portion 4 directly contacts the material of the internal surfaces bounding the cavity 10A.

FIGS. 1, 2 and 3 further show another mode of shifting or deforming a cushion 13 in response to pivoting of the hand wheel 9 to its operative position. The peripheral surface of the pintle 12 for the hand wheel 9 has a flat portion 20 which is surrounded by a cylindrical major portion 21. The flat portion 20 moves into register with the corresponding spherical deforming and/or shifting member 15 which cooperates with the cushion 13 in the recess 14 of the internal surface 7 when the hand wheel 9 is pivoted to the inoperative position of FIG. 3. Therefore, the adjacent member 15 can move to its rearmost position of engagement with the surface bounding the smaller-diameter outer end portion 17 of the bore 16 in the socket 10 so that the cushion 13 can be retracted or otherwise moves away from the end portion 4 of the mandrel 2 preparatory to removal of the end portion 4 from the cavity 10A of the socket 10. When the hand wheel 9 is pivoted back to the operative position of FIG. 2, the member 15 is disengaged from the flat portion 20 and is engaged by the cylindrical major portion 21 of the peripheral surface of the pintle 12 which acts not unlike an eccentric and moves the member 15 upwardly, as viewed in FIG. 2, in order to shift or deform the corresponding cushion 13 into engagement with the adjacent facet of the end portion 4. The flat portion 20 can be replaced with a relatively shallow depression of the pintle 12; all that counts is to insure that a portion of the peripheral surface of the pintle or an analogous pivot member for the hand wheel 9 can move the adjacent spherical or otherwise configurated displacing or shifting member 15 when the hand wheel 9 is moved to its operative position whereby the associated cushion 13 moves (either in its entirety or in part) into engagement with the adjacent facet of the end portion 4. It will be noted that the pintle 12 performs several functions, namely, those of defining a pivot axis for the hand wheel 9 and of shifting the adjacent spherical member 15 for the cushion 13 which is recessed into the internal surface of the socket 10. The second function can be performed by a discrete part (e.g., an eccentric) which shares the angular movements of the pintle 12.

The cushion 13 in the internal surface 8 of the hand wheel 9 is shiftable toward and away from the corresponding facet of the end portion 4 by a screw 22 which meshes with the hand wheel. The screw 22 preferably serves as an adjusting means for the corresponding cushion 13, i.e., the peripheral surfaces of the cushion are preferably bonded or otherwise secured to the surfaces bounding the respective recess 14 and the screw 22 merely serves to deform the central portion of the cushion so that such central portion projects beyond the internal surface 8 and can engage the adjacent facet of the end portion 4 when the hand wheel 9 is moved to the operative position of FIG. 2.

It will be readily appreciated that the end portion 4 of the mandrel 2 can be held against wobbling by resorting to a relatively small number of cushions, e.g., to a single cushion or to the three cushions 13 which are installed in the socket 10 so that they extend beyond the internal surfaces 5, 6 and 7 when the hand wheel 9 is moved to the operative position. Alternatively, the end portion can be engaged by the cushions in the surfaces 5, 6, in the surfaces 7, 8 or in the surface 8.

The mandrel 2 comprises an intermediate centering portion 25 which is immediately adjacent to the end portion 4 and is bounded in part by a substantially U-shaped surface (indicated in FIG. 1 by broken lines). This centering portion 25 is receivable in a groove 23 forming part of a complementary centering portion of the socket 10. The groove 23 is outwardly adjacent to the portion of the cavity 10A which is bounded by the internal surfaces 5-7. The purpose of the cylindrical convex and concave surfaces bounding the centering portion 25 of the mandrel 2 and the groove 23 of the socket 10 is to furnish an additional or auxiliary centering action which insures proper positioning of the mandrel 2 with reference to the shaft 3. It can be said that the portion 25 of the mandrel 2 and the grooved portion of the socket 10 constitute an auxiliary centering means for the mandrel 2 in the operative position of the hand wheel 9. The legs of the U formed by the centering portion 25 diverge upwardly toward the internal surface 8 of the hand wheel 9 to facilitate the insertion of the end portion 4 into the cavity 10A of the socket 10.

FIG. 3 illustrates slightly modified auxiliary centering means including a collar 26 disposed at the free end of the end portion 4 of the mandrel 2 and overlying an undercut centering portion 24 of the cavity 10A in the socket 10.

An advantage of rounded or partially rounded auxiliary centering means is that such centering means can be machined with a higher degree of precision than polygonal centering means. Thus, such centering means can be machined with minimal tolerances. Therefore, the tolerances which must be compensated for by the cushions 13 are much smaller than the tolerances in couplings wherein the clearances exist between polygonal surfaces. Such configuration in auxiliary centering means contributes to more accurate axial alignment of the mandrel with the shaft 3 as well as to a reduction in noise when the shaft 3 drives the mandrel 2.

The auxiliary centering means 23, 25 can be used simultaneously with the auxiliary centering means 24, 26. Alternatively, either of these auxiliary centering means can be used alone. The portion 26 of the cavity 10A in the socket 10 need not extend along a large arc; for example, an arc of 90 degrees (adjacent to the internal surface 7) often suffices to furnish a satisfactory centering action. The collar 26 need not extend beyond the top facet of the end portion 4, as viewed in FIGS. 1, 2 and 3. In fact, the corresponding portion of the collar 26 can be chamfered, as shown at 26A in FIG. 3, in order to facilitate insertion of the end portion 4 into the cavity 10A. The end portion 4 is located between the major (cylindrical) portion of the mandrel 2 and the collar 26.

A combination of one or more auxiliary centering means (such as 23, 25 or 24, 26) with one or more cushions has been found to contribute to practically complete elimination of noise and to eliminate any wobbling of the end portion 4 in the composite socket 1a. Also, the mandrel 2 is invariably held in a position of exact axial alignment with the shaft 3.

If the mandrel 2 is provided with two multi-facetted polygonal end portions 4 (this is not specifically shown in the drawing), and if each end portion of the mandrel 2 has a collar 26 which enters a complementary portion 24 of the cavity 10A in the respective socket 10, the mandrel 2 can transmit axial stresses to the antifriction bearings 11 for the corresponding shafts 3 (such bearings can be replaced with thrust bearings of the type specifically designed to take up substantial axial stresses). If the supports 11A are movable axially of the shaft or shafts or vice versa, the mandrel 2 can be used as a means for shifting the shaft or shafts axially provided, of course, that the connection between the mandrel and each socket 10 (or between the mandrel and at least one socket) can transmit axial stresses.

Figure 4:
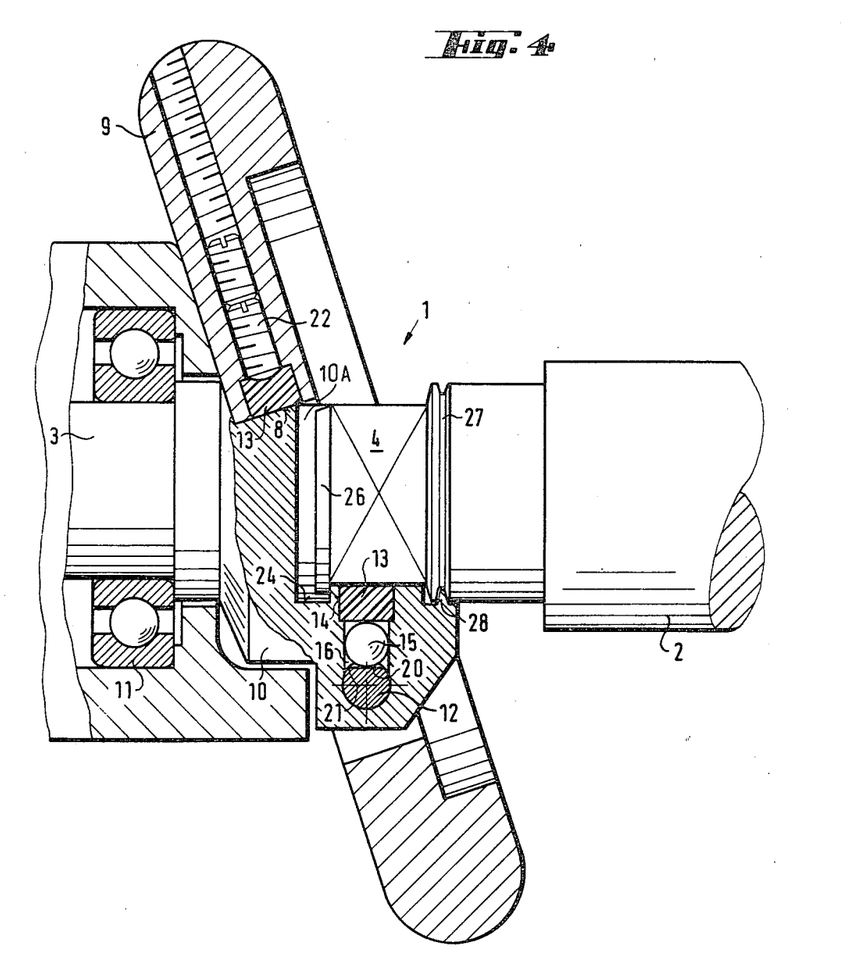
FIG. 4 illustrates a second embodiment in a view which is similar to that of FIG. 3.

FIG. 4 shows an embodiment in which the centering portion 25 of FIG. 2 is replaced with a modified centering portion having a circumferential groove 27 for reception of a complementary centering projection or rib 28 on the socket 10. The groove 27 is machined into the mandrel 2 at that end of the polygonal end portion 4 which is remote from the shaft 3. The rib 28 may constitute an arcuate projection which extends along an arc of, for example, 90 degrees. Such a combination is capable of furnishing a highly satisfactory auxiliary centering action. However, the rib 28 can also extend along an arc of up to 180 degrees, as long as it allows for convenient insertion of the end portion 4 into and removal of the end portion 4 from the cavity 10A of the socket 10 when the hand wheel 9 is moved to the inoperative position of FIG. 4. The coupling 1 of FIG. 4 further comprises the auxiliary centering means 24, 26. The main function of the centering means 24, 26 is to transmit axial stresses because the centering action can be readily achieved by the rib 28 alone. The centering action of the rib 28 is further enhanced if it tapers from the root portion toward the top land thereof and if the groove 27 of the mandrel 2 is bounded by a complementary surface, i.e., if the width of the groove 27 decreases in a direction toward the axis of the mandrel 2. Thus, the cross-section of the rib 28 and of the groove 27 can have a substantially trapeziform outline.

Figure 5:
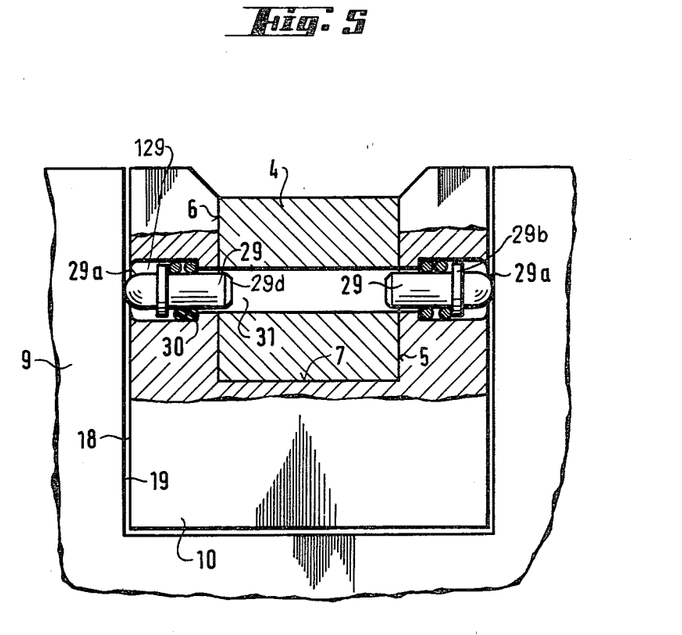
FIG. 5 is a fragmentary transverse sectional view of a third embodiment of the coupling in which the elastic cushioning elements or pads are replaced by spring-biased studs or pins.

FIG. 5 shows a further modification wherein the elastic or slightly elastic cushions 13 are replaced by reciprocable cushioning elements in the form of pins or studs 29 which are biased by helical springs 30 away from complementary holes 31 of the polygonal end portion 4 of the mandrel. The pins 29 can be used in addition to or as a substitute for some or all of the pad-like cushions 13.

In the embodiment of FIG. 5, the surfaces 5 and 6 of the socket 10 are formed with passages or bores 129 having smaller-diameter portions adjacent to the end portion 4 and larger-diameter portions which are nearer to the respective external surfaces 18. The pins 29 have collars 29c which are reciprocable in the larger-diameter portions of the bores 129 and serve to stress the corresponding springs 30 when the hand wheel 9 is moved to the operative position (shown in FIG. 5) so that the internal surfaces 19 of the hand wheel are immediately adjacent to the corresponding external surfaces 18 of the socket 10. The surfaces 19 bear against the preferably rounded outer end portions 29a of the pins 29 and urge the inner end portions of the pins into the corresponding holes 31 in the end portion 4. In the embodiment of FIG. 5, the holes 31 constitute a single hole which extends all the way between two parallel facets of the end portion 4. The common axis of the pins 29 is parallel to the axis of the pintle 12 (not shown in FIG. 5). It is assumed that the pins 29 of FIG. 5 replace those cushions 13 which, in the previously described embodiments, are installed in the surfaces 5 and 6 of the socket 10. In addition to these pins, the coupling which includes the structure of FIG. 5 may but need not have one or two cushions 13, e.g. a cushion 13 in the internal surface 7 and/or a cushion 13 in the internal surface 8.

The springs 30 expand as soon as the hand wheel 9 is moved to the inoperative position whereby the inner end portions of the pins 29 are retracted from the hole 31 and the end portion 4 of the mandrel can be removed from the cavity of the socket 10. It will be noted that the depressing action of the internal surfaces 19 of the hand wheel 9 upon the outer end portions 29a of the pins 29 of FIG. 5 is similar or analogous to that which the surfaces 19 of the hand wheel 9 shown in FIGS. 1 to 4 exert upon the spherical members 15. In fact, the end portions 29a can be said to constitute shifting members which are integral with the respective cushioning elements 29.

The inner end portions of the pins 29 have short frustoconical portions 29d to facilitate their introduction into the hole 31 under the action of the springs 30. If desired, such frustoconical portions can be replaced with semispherical or otherwise configurated portions which taper toward the center of the end portion 4.

The pins 29 can be used as a substitute for the auxiliary centering means 24, 26 because they are capable of transmitting axial stresses from the socket 10 to the mandrel 2 or vice versa.

When the mandrel 2 transmits or is likely to transmit axial stresses to the shaft or shafts 3 (or vice versa), the coupling of the present invention preferably further comprises an additional cushioning means at the front end face or facet 204 of the end portion 4, namely, at that end face or facet which faces the adjacent shaft 3. Such further cushioning means is the cushion 32 which is illustrated in FIGS. 2 and 3. The cushion 32 is relatively small and is installed in the head of a screw 35 or an analogous carrier. The latter has a shank 34 which is externally threaded and meshes with the socket 10. The axis of the carrier 35 is parallel to or coincides with the axis of the shaft 3 so that the cushion 32 engages the central portion of the end face or facet 204 of the end portion 4. The head of the carrier 35 extends into the cavity 10A of the socket 10, i.e., beyond the corresponding internal surface 33. This internal surface is normal to the axis of the shaft 3. The position of the cushion 32 (as considered in the axial direction of the shaft 3) can be adjusted by rotating the screw 35 with reference to the shaft 3. Such adjustment can be resorted to in order to select the bias of the end face 204 upon the cushion 32 and to thus insure that the end portion 4 is coupled to the socket 10 without any play, as considered in the direction of the common axis of the shaft 3 and mandrel 2. The external surface of the head of the screw 35 is preferably corrugated or toothed so that it can be readily engaged by a wrench or the like when the user wishes to change the axial position of the screw relative to the shaft 3 and mandrel 2.

An important advantage of the improved coupling is that the mandrel 2 can be rapidly coupled to or detached from the shaft 3 and that the shaft 3 cannot wobble relative to the mandrel, and/or vice versa, when the hand wheel 9 of the composite socket 1a is held in the operative position. Another advantage of the improved coupling is that the parts of the shaft and/or mandrel and/or other components need not be machined with utmost precision because the cushioning elements 13 and/or 29 and/or 32 compensate for tolerances and prevent wobbling, generation of noise and/or other undesirable phenomena which are characteristic of conventional couplings.

The manipulation of the improved coupling is simple, especially since some or all of the cushioning elements are designed and mounted in such a way that they automatically engage the end portion 4 of the mandrel 3 when the hand wheel 9 assumes its operative position and that they are automatically disengaged from the end portion 4 when the hand wheel 9 is moved to the position of FIG. 3 or 4 preparatory to removal of the end portion 4 from the cavity 10A of the socket 10 or preparatory to insertion of the end portion 4 into such cavity. The same holds true for the auxiliary centering means which are disengaged in automatic response to opening and are engaged in automatic response to closing of the composite socket 1a.

Still another important advantage of the improved coupling is that it can transmit (if necessary) axial stresses from the mandrel 2 to one or more shafts 3 and/or vice versa.

The extent of noise reduction and/or elimination of wobbling can be regulated in a number of ways, e.g., by increasing or reducing the number of cushioning elements and/or centering means and/or by changing the force with which the cushioning elements bear against the end portion 4 of the mandrel 2 when the hand wheel 9 of the composite socket 1a is in operative position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for separably connecting a mandrel having a multi-facetted end portion of polygonal cross-sectional outline with a rotary torque-transmitting component, comprising a socket rotatable with the torque-transmitting component, said socket having a cavity for receiving the end portion of the mandrel with at least some clearance, and said socket further having internal surfaces which bound said cavity and are complementary to the facets of the end portion of the mandrel, said socket also having a portion which is movable between an operative and an inoperative position in which the end portion of the mandrel is respectively confined in and removable from said cavity; means for compensating for the clearance of the end portion of the mandrel in said cavity, said compensating means including at least one cushioning element disposed between one of said internal surfaces and the corresponding facet of the end portion of the mandrel in said cavity, and at least a portion of said cushioning element being movable between an extended position in which said cushioning element extends beyond the respective internal surface of said socket and a retracted position; and means for maintaining said cushioning element in said extended position when said movable portion of said socket is in said operative position.

2. The coupling of claim 1, wherein said cushioning element is mounted on said socket.

3. The coupling of claim 1, wherein said socket has a recess for a portion of said cushioning element.

4. The coupling of claim 1, wherein said socket has at least two internal surfaces which are disposed opposite each other and said compensating means comprises two cushioning elements each disposed between a different one of said two internal surfaces and the respective facet of the end portion in said cavity.

5. The coupling of claim 1, wherein said compensating means includes a plurality of cushioning elements each disposed between a different one of said internal surfaces and the respective facet of the end portion in said cavity.

6. The coupling of claim 1, wherein the end portion of the mandrel has four facets and said socket has an equal number of internal surfaces each closely adjacent to a different facet when the end portion is inserted into said cavity.

7. The coupling of claim 1, wherein said cushioning element is disposed substantially centrally of the respective internal surface of said socket.

8. The coupling of claim 1, further comprising means for moving said cushioning element said retracted position in response to movement of said movable portion of said socket to said inoperative position.

9. The coupling of claim 1, wherein said socket further includes a second portion and said movable portion of said socket is movable relative to said second portion, said means for maintaining said cushioning element in said extended position comprising a member which is movably installed in said second portion of said socket and is located in the path of movement of said movable portion of said socket to said operative position.

10. The coupling of claim 9, wherein said member is a sphere.

11. The coupling of claim 9, wherein said member is a pin.

12. The coupling of claim 9, wherein said second portion of said socket has a passage for said member and a portion of said member extends from said passage into said path in said inoperative position of said movable portion of said socket.

13. The coupling of claim 12, wherein said one surface has a recess for said cushioning element and said recess communicates with said passage.

14. The coupling of claim 12, wherein said passage has an end portion which is remote from said cavity and is sufficiently small to prevent said member from passing therethrough in its entirety.

15. The coupling of claim 9, wherein said movable portion has inner surfaces and said second portion has external surfaces surrounded by said inner surfaces in the operative position of said movable portion, said member extending outwardly beyond one of said external surfaces in said retracted position of said cushioning element so as to be displaced by the corresponding inner surface during movement of said movable portion to said operative position.

16. The coupling of claim 1, wherein said movable portion of said socket is pivotable between said operative and inoperative positions.

17. The coupling of claim 9, wherein said movable portion of said socket comprises a pintle having a peripheral surface including a first portion which is substantially cylindrical and a second portion which is offset relative to said cylindrical first portion, said member being engaged by said cylindrical first portion of said peripheral surface in said operative position, and by said second portion of said peripheral surface in said inoperative position, of said movable portion of said socket.

18. The coupling of claim 9, wherein said movable portion of said socket includes a wheel which is pivotable between said operative and inoperative positions, said wheel having at least one surface which moves said member relative to said second portion of said socket in response to movement of said wheel to said operative position.

19. The coupling of claim 1, wherein said one internal surface is provided on said movable portion of said socket.

20. The coupling of claim 19, wherein said cushioning element is mounted on said movable portion of said socket and said movable portion includes means for adjusting the position of at least a portion of said cushioning element with respect to said movable portion.

21. The coupling of claim 20, wherein said adjusting means includes a screw meshing with said movable portion of said socket.

22. The coupling of claim 1, wherein said cushioning element consists, at least in part, of a relatively hard and wear-resistant synthetic plastic material.

23. The coupling of claim 22, wherein said plastic material is polyurethane.

24. The coupling of claim 1, wherein said cushioning element is recessed into said one internal surface, said cushioning element including a reciprocable pin-shaped member having a portion extending into the path of movement of said movable portion of said socket to said operative position so that said member is displaced towards a facet of the end portion in response to movement of said movable portion to operative position.

25. The coupling of claim 24, wherein said member has a rounded end portion extending into the path of movement of said movable portion of said socket.

26. The coupling of claim 24, further comprising means for yieldably biasing said member into the path of movement of said movable portion of said socket.

27. The coupling of claim 24, wherein said internal surfaces include a second surface disposed opposite said one internal surface; and further comprising a second cushioning element recessed into said second internal surface and including a second reciprocable pin-shaped member arranged to move towards the adjacent facet of the mandrel end portion in response to movement of said movable portion of said socket to said operative position.

28. The coupling of claim 24, wherein the end portion of the mandrel has a hole for reception of said member in the operative position of said movable portion of said socket.

29. The coupling of claim 28, wherein said member has an end portion which tapers in a direction toward the adjacent facet of the end portion of the mandrel.

30. The coupling of claim 29, wherein said end portion of said member constitutes the frustum of a cone.

31. The coupling of claim 24, wherein said internal surfaces include a second surface disposed opposite said one internal surface; and further comprising a second cushioning element recessed into said second internal surface and including a second reciprocable pin-shaped member arranged to move towards the adjacent facet in response to movement to operative position, the end portion having a hole and said members having portions extending into said hole in operative position of said movable portion.

32. The coupling of claim 1, wherein the mandrel has a second multi-facetted end portion; further comprising a second socket having a second cavity for the second end portion, said second socket having internal surfaces bounding said second cavity; and further comprising at least one cushioning element interposed between at least one internal surface of said second socket and a facet of the second end portion.

33. A coupling for separably connecting a mandrel having a multi-facetted end portion of polygonal cross-sectional outline with a rotary torque-transmitting component, comprising a socket rotatable with the torque-transmitting component, said socket having a cavity for receiving the end portion of the mandrel with at least some clearance, and said socket further having internal surfaces which bound said cavity and are complementary to the facets of the end portion of the mandrel; and means for compensating for the clearance of the end portion of the mandrel in said cavity, said compensating means including at least one cushioning element disposed between one of said internal surfaces and the corresponding facet of the end portion of the mandrel in said cavity, and said socket and the mandrel comprising complementary auxiliary centering means which cooperate with each other upon insertion of the end portion of the mandrel into said cavity.

34. The coupling of claim 33, wherein said socket has a portion which is movable between an operative and an inoperative position in which the end portion of the mandrel is respectively confined in and removable from said cavity.

35. The coupling of claim 33, wherein one of said centering means comprises a substantially cylindrical convex surface on the mandrel and the other of said centering means comprises a complementary substantially cylindrical concave surface on said socket.

36. The coupling of claim 33, wherein one of said centering means has a groove bounded by a substantially U-shaped surface having a concave central portion and divergent outer portions.

37. The coupling of claim 33, wherein one of said centering means has an undercut groove.

38. The coupling of claim 37, wherein said groove is provided in said socket and the mandrel has a collar which extends into said groove in response to insertion of the end portion of the mandrel into said cavity.

39. The coupling of claim 38, wherein the mandrel includes a major portion and the multi-facetted end portion thereof is disposed between such major portion and the collar.

40. The coupling of claim 33, wherein the mandrel further includes a major portion and one of said centering means is disposed between such major portion and the multi-facetted end portion of the mandrel.

41. The coupling of claim 33, wherein one of said centering means has an arcuate groove and the other of said centering means includes an arcuate projection extending into said groove when the multi-facetted end portion of the mandrel is inserted into said cavity of said socket.

42. The coupling of claim 41, wherein said groove is provided on the mandrel and the width of said groove decreases in a direction toward the axis of the mandrel.

43. The coupling of claim 41, wherein said projection is a rib having a substantially trapeziform cross-sectional outline.

44. The coupling of claim 41, wherein said projection is a rib on said socket.

45. A coupling for separably connecting a mandrel having a multi-facetted end portion of polygonal cross-sectional outline with a rotary torque-transmitting component, comprising a socket rotatable with the torque-transmitting component, said socket having a cavity for receiving the end portion of the mandrel with at least some clearance, and said socket further having internal surfaces which bound said cavity and are complementary to the facets of the end portion of the mandrel; and means for compensating for the clearance of the end portion of the mandrel in said cavity, said compensating means including at least one cushioning element disposed between an end face of the end portion of the mandrel in said cavity and the corresponding internal surface of said socket.

46. The coupling of claim 45, further comprising a carrier for said cushioning element, said carrier being secured to said socket.

47. The coupling of claim 46, wherein said carrier is a screw having a head supporting said cushioning element and a shank mating with said socket.

48. The coupling of claim 47, wherein said screw is coaxial with the torque-transmitting component.

* * * * *